VEHICLE INSTRUMENT CONSOLE HAVING PIVOTING GUARD COVER

Filed May 9, 1967 Sheet 1 of 3

Inventors:
Jack M. Deli
Walter C. Jacobsen
Ronald J. Fanslow
Hugo O. Mosquera
By John W. Gaines Atty.

Inventors:
Jack M. Deli
Walter C. Jacobsen
Ronald J. Fanslow
Hugo O. Mosquera
By John W. Gaines
Atty.

Inventors:
Jack M. Deli
Walter C. Jacobsen
Ronald J. Fanslow
Hugo O. Mosquera
By John W. Gaines
Atty.

United States Patent Office 3,452,835
Patented July 1, 1969

3,452,835
VEHICLE INSTRUMENT CONSOLE HAVING PIVOTING GUARD COVER

Jack M. Deli, Wheaton, Walter C. Jacobsen, Rolling Meadows, Ronald J. Fanslow, Palatine, and Hugo O. Mosquera, Wheaton, Ill., assignors to International Harvester Company, Chicago, Ill., a corporation of Delaware Filed May 9, 1967, Ser. No. 637,122
Int. Cl. B60k *37/00;* B62d *25/14*
U.S. Cl. 180—90 12 Claims

ABSTRACT OF THE DISCLOSURE

Console type instrument box for vehicles, having a built-in guard affording two positions relative to the instrument recess, one position covering the face of the instruments against tampering and the other position withdrawn by being pivoted 90° to a point of nonuse in the recess.

This invention is a modification of that invention which is disclosed in the same assignee's U.S. Patent No. 3,302,743, that invention relating to a resiliently pivoted rotor which carries the instruments in a vehicle, and on which the instruments are pivoted between a frontwardly viewed position and an inaccessible position of nonuse guarded by an exposed blank wall on the rotor.

According to this invention, the instrument panel has a fixed position within a cantilevered box, and provision is made for a built-in guard shiftable by the operator between an essentially vertical position completely covering the instruments and a 90° pivoted position out of the way and essentially concealed and blending with the cantilevered box.

One object of the invention is to provide such a built-in guard which, in the unused position, is substantially horizontal, is generally imperceptible, and does not interfere with normal viewing of the vehicle instruments. However in the vertical position of use, the guard formidably blocks access to the instruments and is readily locked in place to insure against damage to the instruments and other acts of vandalism thereon.

Features, objects, and advantages will either be specifically pointed out or become apparent when, for a better understanding of our invention, reference is made to the following description, taken in conjunction with the accompanying drawings which show a preferred embodiment thereof and in which.

Figures 1, 2:
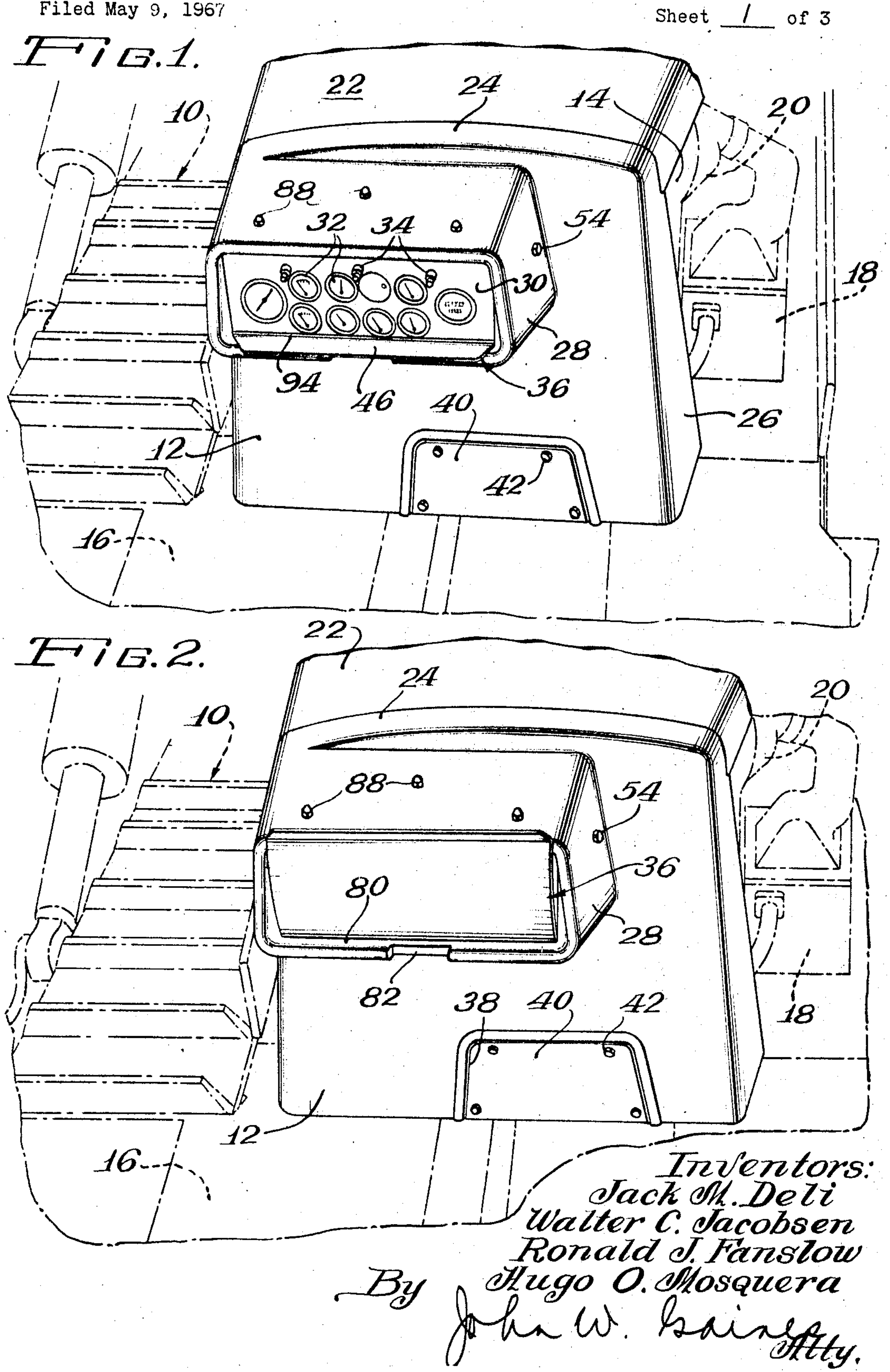
FIGURES 1 and 2 are perspective face views looking diagonally downwardly on an instrument console embodying our invention.

More particularly in the crawler track vehicle as indicated at 10 in FIGURES 1 and 2 of the drawings, a generally upstanding dash panel 12 is shown separating the rear of the vehicle engine compartment 14 from the front end of an operator's platform 16. The engine compartment 14 carries externally located components such as a water-cooled, air intercooler 18 which receives air from a turbocharger compressor 20, and the compartment 14 is covered by a fore and aft extending hood 22 over the front of the vehicle.

The dash panel 12 has top and side flanges 24 and 26 extending away from the operator, not shown, and a cantilevered box or console 28 which extends toward the operator. A sub panel constituting an instrument panel 30 is mounted in vertical disposition within the box 28 so as to expose the faces of the instrument cluster 32 provided for the vehicle. A plurality of instrument lamps 34 projects from the plane of the instrument panel toward the operator for illuminating the instruments.

A guard panel or cover 36 has when not in use a nominally concealed position into which it is pivoted as shown in FIGURE 1, and has an in-use or guard position in which it is vertically disposed as shown in FIGURE 2 to conceal the instruments.

A beaded cut-out opening 38 in the bottom of the dash panel 12 receives an access plate 40 which is removably secured thereto by screws 42.

Figure 3:
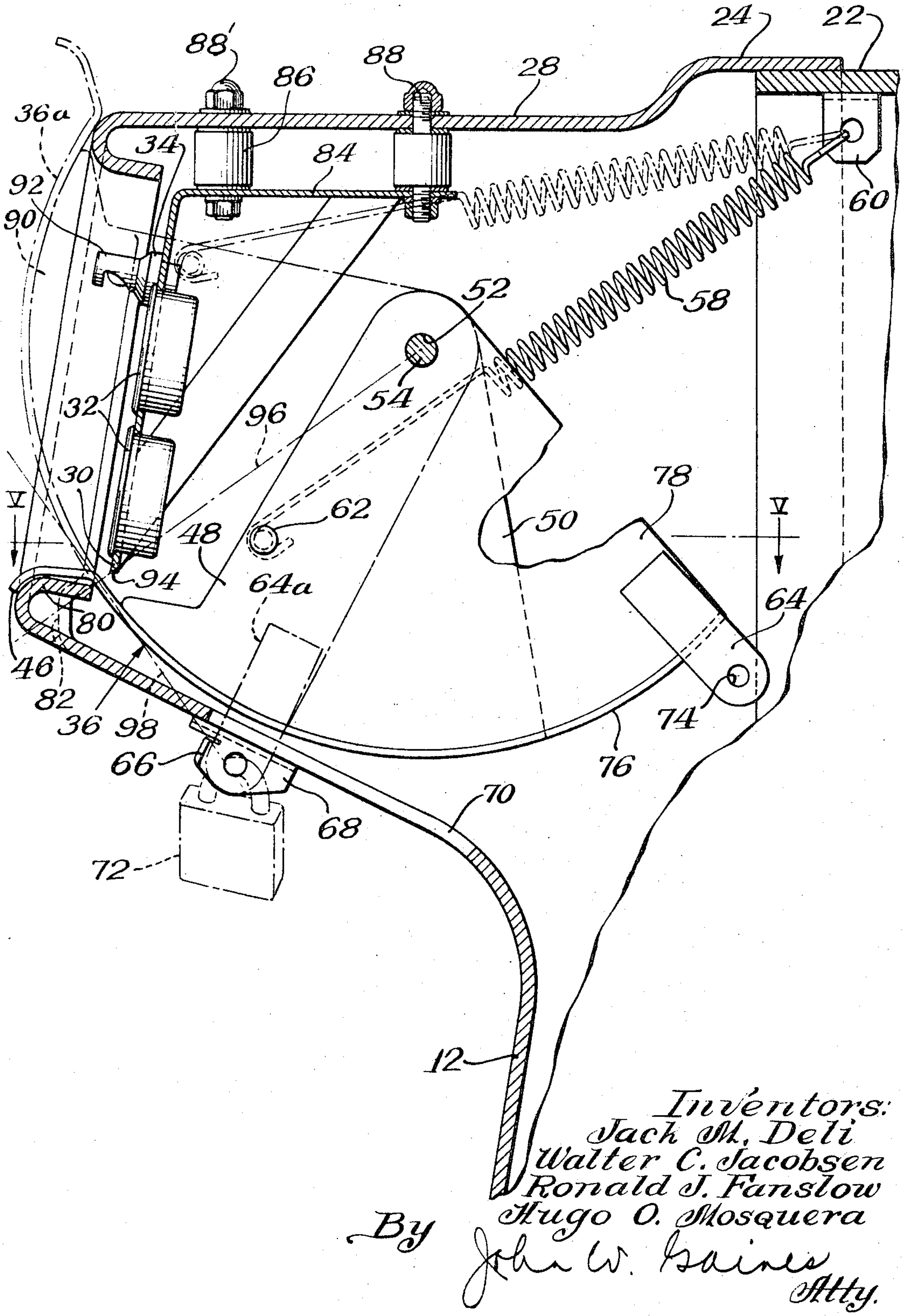
FIGURES 3 and 4 are, respectively, a side elevational view in cross-section and a front elevational view of the console.
Figure 5:
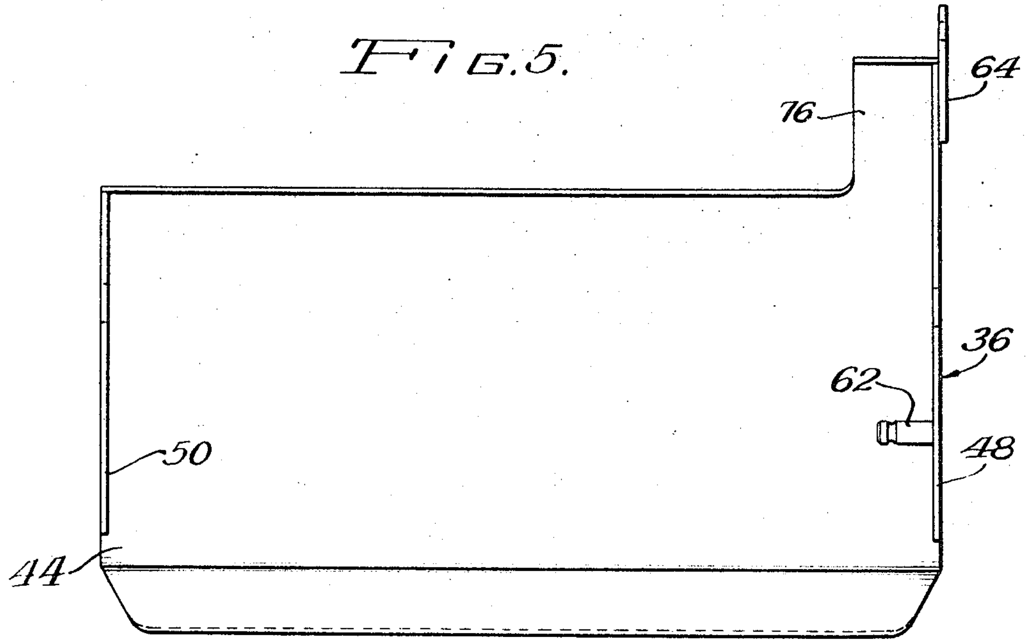
FIGURE 5 is a detail plan view of the guard as shown in FIGURES 3 and 4, but with the rest of the showing of those two figures omitted for clarity.
Figure 4:
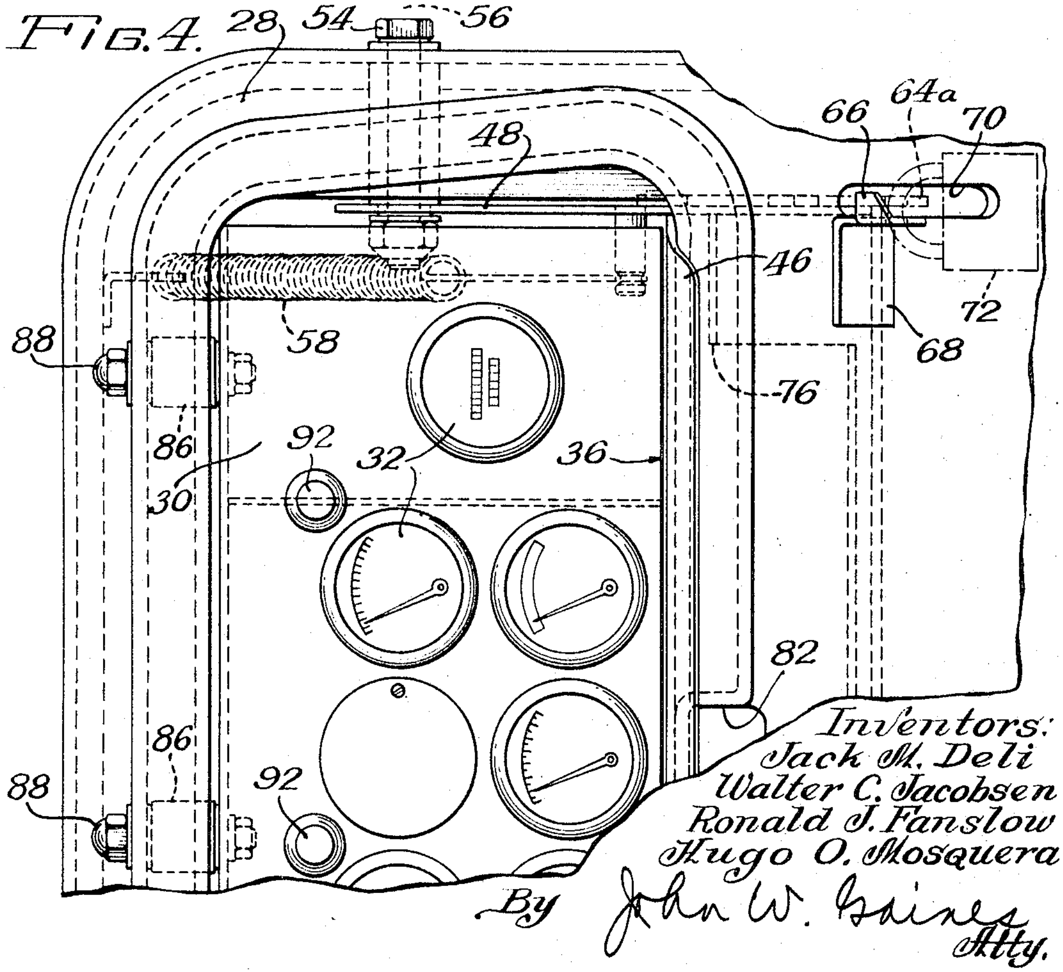

In FIGURES 3, 4 and 5, the guard 36 includes a body panel 44 which in cross section is curved on the arc of a circle, also an integral, free-standing handle 46 formed by a lip-shaped, full width flange which is diagonally related to and does not conform to the cylindrical shape of the body panel 44, also right and left arm plates 48 and 50, respectively, which are provided with circular trunnion holes 52 at the swing center points, and two pivots 54 which are rotatably secured at such fixed swing points to the guard panel arm plates, being received in the two holes and defining a fixed swing axis 56.

A helical tension spring 58 is hooked at one end in a center hole in a fixed bracket 60, and is hooked at the other end to a stud 62 which is fixed perpendicularly upon the right arm plate 48 of the guard. The spring 58 contracts with an overcenter action when in a position to either side of a line connecting the axis 56 and the center hole of the bracket 60, biasing the guard 36 into an extreme position at that side of the line. The in-use extreme position of the guard is indicated by the broken lines **36*a* in FIGURE 3, corresponding to the referred to showing of FIGURE 2. The upward travel stops in that position due to engagement of a locking tab lug carried by the guard which, in the position shown by the broken lines 64*a* abuts the transversely disposed stop lug 66 on a fixed keeper 68. The keeper 68 is affixed to the outside of the box 28 adjacent a longitudinal lug slot 70 formed in the bottom of the latter. A padlock 72 passes through registering circular apertures in the locking lug and the keeper 68** to prevent unwanted displacement of the guard.

The referred to locking lug is indicated at 64 in solid lines in FIGURES 3 and 5, and the locking aperture therein is indicated at 74. A narrow cylindrical tail extension 76 on the panel body 44 and an edge portion 78 of the right plate 48 which extends beyond the corresponding edge of the left arm plate 50, are secured together to form a rigid corner structure, and together they carry the locking lug 64 so that it is disposed with and swings in the vertical plane of the longitudinal slot 70.

The extreme withdrawn position into which the guard is pivoted is shown in solid lines in FIGURES 3 and 4, corresponding to the referred to showing of FIGURE 1. In that 90° rotated position, the lip-like, guard handle 46 engages the bottom edge 80 in an instrument viewing opening leading into a four-sided recess defined by the box 28. The edges of the opening are in the corresponding form of a four-sided bead, having a depression 82 located at the mid-portion of the bottom edge 80 to provide a relieved clearance space or finger space.

The instrument panel 30 integrally depends from and is braced with respect to a diagonally bent, planar mounting flange 84. The mounting flange 84 is carried by the top wall of the box 28 on three vibration isolation mountings or cushions each including a neoprene cylinder 86 and a nut 88′ and threaded fastener means 88 connected between the box and flange, respectively, and the cylinder 86. The instrument cluster 32 is thus protected from vehicle vibrations and yet the depending panel 30 is rigid in its inset position relative to the opening.

When in use, the guard panel defines a shallow, blocked off chamber 90 in the plane of the opening, allowing clearance for three, perpendicularly projecting light hoods 92 carried on the lamps 34. In the general sense, the guard panel and the main dash panel are arranged adjacently in spaced apart, generally vertical and parallel planes.

At the same time, the left and right vertical edges of the panel 30 define with the adjacent lateral side edges of the opening a pair of slots freely receiving the outwardly projecting arm plates 48 and 50. More importantly, the plane of a slot 94 between the horizontal lower edge of the panel 30 and the confronting bottom side of edge 80 of the opening generally coincides with a radius 96 passing through the swing axis 56 of the guard. The resulting path 98 through the slot 94 is tangent to the arc of the guard body 44 at the approximate point of intersection between the latter and the plane of the slot. The arrangement results in no interference between the movable guard and the fixed panel 30, and the body panel 44 is at all times within and endwise aligned to the slot 94.

The dash panel 12 and the cantilevered box 28 in one preferred form were made in one piece, out of Fiberglas material prepared by an open mold process. Specifically, the material was a laminate of Fiberglas-reinforced polyester.

In preparing the vehicle for operation, the operator removes the padlock 72, moves the guard downwardly and away into its 90° pivoted position wherein the locking tab 64 is withdrawn from the keeper 68, and relocks the padlock 72 in the empty keeper 68 to store the lock.

In order to secure the vehicle upon shutdown, the operator restores the guard to its vertical, closed position and relocks it with the padlock 72. The instruments remain inset behind, and parallel to the plane of, the opening and access to the opening is completely blocked by the panel body 44 and arm plates of the guard.

Variations within the spirit and scope of the invention described are equally comprehended by the foregoing description.

What is claimed is:

1. In a console type instrument arrangement for a vehicle:
- generally upstanding dash structure;
- cantilevered boxy structure thereon defining an instrument recess rearwardly of the dash structure and having a rear opening;
- instrument means in the cantilevered structure recessed ahead of the plane of the opening; and
- a generally upstanding curved guard panel swingably secured at a fixed swing center to the cantilevered structure and swingable from a position exposing said instrument means to a position overlying said instrument means and opening therefor, and which for an appreciable portion is, when overlying said instrument means and opening therefor, offset rearwardly of the plane of the opening whereby said panel when in said last named position covers said instrument means to prevent tampering therewith, said guard panel being curved on the arc of a circle centered at said swing center;
- said instrument means and an adjacent edge of said opening defining a narrow gapped clearance path for the guard panel which is tangent to the arc thereof at the point of intersection between the guard panel and the plane of the gap.

2. The invention of claim 1, characterized by the dash and cantilevered structures being in one piece made of Fiberglas.

3. The invention of claim 1, characterized by the guard panel being free standing at its upper end when in said overlying position and operatively pivoting therefrom on said swing center to a 90° withdrawn position within the recess to expose said instrument means.

4. The invention of claim 1, characterized by:
- said guard panel, when in said overlying position, and said instrument means defining a shallow, blocked off chamber in the plane of the opening; and
- instrument light hood means generally perpendicular to the instrument means and projecting therefrom into said chamber.

5. Console type instrumentation arrangement for a vehicle comprising:
- main dash and guard panels arranged adjacently in spaced apart, generally vertical planes; and
- a subpanel in an operative relationship between the foregoing panels so as to be inset ahead of the guard panel and offset rearwardly from the main panel;
- a cantilevered box-like structure having open front and rear ends and rigidly secured to and extending rearwardly from said main dash panel and supporting said guard and subpanels;
- said subpanel having first independent means mounting same in an opening in said box-like structure, said first independent means comprising plural mountings confined to one of the top and bottom sides of said structure, so that the subpanel projects into closely edge spaced relation to, and provides an intervening clearance slot with, the other of said top and bottom sides;
- said guard panel having second independent means mounting same to the supporting structure, comprising pivots secured at fixed points to the guard panel and to said supporting structure for pivoting said guard panel 90° about said pivots from a first position wherein said guard panel completely overlies said subpanel through said clearance slot to a second position wherein said guard panel uncovers said opening exposing said subpanel.

6. The invention of claim 5, characterized by said guard panel being curved on the arc of a circle and endwise aligned in all positions with the clearance slot.

7. The invention of claim 6, said subpanel characterized by an instrument panel, and when said guard panel is in said first position said instrument panel is protected against tampering therewith.

8. The invention of claim 7, the first independent mounting means characterized by an interposed cushion at each of said plural mountings for suspending the instrument panel yieldably protected from vehicle vibration.

9. In a tractor:
- a dash panel having a generally four sided hollow box-like structure extending rearwardly therefrom for receiving a panel of instruments therein and defining the edges of an opening at the rear of the box-like structure for viewing the instruments;
- an instrument panel which is inset ahead of the viewing opening in substantially parallel relation to the plane thereof, said panel being secured to that side of said box-like structure which is adjacent one of the top and bottom edges of the opening and defining a pair of clearance slots with the two side edges of the opening;
- a guard panel, means fixed to said guard panel and said box-like structure pivotally mounting said guard panel on said box-like structure, said guard panel in a first position overlying the plane of said opening and which for an appreciable portion is offset rearwardly of said plane, and when pivoted 90° about said means to a second position uncovers said opening thereby exposing said instrument panel; and
- said guard panel in said first position cooperating with the three named edges of said opening and said instrument panel to mutually define a shallow, blocked-off chamber, said guard panel being curved on the arc of a circle so as to pivot through said 90° without interference in another clearance slot defined by the instrument panel and the remaining one of said top and bottom edges.

10. The invention of claim 9, characterized by:

a tension spring extending from a point fixed with respect to said box-like structure ahead of the pivot axis of the guard panel to a point on the guard panel behind said pivot axis, said points being so located that said spring passes at one side of said pivot axis when the guard panel is in said first position and so that said spring passes at the other side of said pivot axis when the guard panel is in said second position.

11. The invention of claim 9, characterized by said other clearance slot being adjacent the bottom of said box-like structure at the bottom edge of said opening, so that the guard panel passes adjacent the bottom edge in swinging from said second position to said first position; and means including a lock interconnecting the guard panel and bottom of said box-like structure to prevent swinging of the guard panel from said overlying first position to said second position.

12. The invention of claim 11, characterized by:

the guard panel being at all times in endwise alignment with said other slot, said other slot defining a narrow clearance path for the guard panel which is tangent to the guard panel at the point of intersection between the arc of the latter and said other slot.

References Cited

UNITED STATES PATENTS

| | | | |
|---|---|---|---|
| 2,091,059 | 8/1937 | Tjaarda | 180—90 |
| 2,202,277 | 5/1940 | Visser | 180—90 |
| 2,973,220 | 2/1961 | White | 296—31 |
| 3,084,973 | 4/1963 | Beckley | 296—31 |
| 3,113,788 | 12/1963 | Johnston | 180—90 |

A. HARRY LEVY, *Primary Examiner.*

U.S. Cl. X.R.

296—70